May 13, 1924.

J. B. STUMPF

FLUID TURBINE

Filed Nov. 9 1922

Witnesses:
F. L. Fox,
N. Berman

John B. Stumpf.
INVENTOR.
BY
ATTORNEY.

May 13, 1924.

J. B. STUMPF

FLUID TURBINE

Filed Nov. 9, 1922

Witnesses:
F. L. Fox
H. Berman

John B. Stumpf.
INVENTOR.
BY
ATTORNEY.

Patented May 13, 1924.

1,494,037

UNITED STATES PATENT OFFICE.

JOHN B. STUMPF, OF TOLEDO, OHIO.

FLUID TURBINE.

Application filed November 9, 1922. Serial No. 599,749.

*To all whom it may concern:*

Be it known that I, JOHN B. STUMPF, a citizen of the United States, residing at Toledo, in the county of Lucas and State of Ohio, have invented certain new and useful Improvements in Fluid Turbines, of which the following is a specification.

This invention has relation to new and useful improvements in fluid turbines, and has for the primary object thereof the provision of such a turbine that is simple of construction, easy of operation and compact of form, and one that may be advantageously operated by either steam, compressed air or gas.

Other objects of the invention will appear as the nature thereof is better understood after the drawings and specification have been carefully reviewed.

In the drawings forming a part of this application, like numerals of reference indicate similar parts in the several views, and wherein:—

Figure 1:
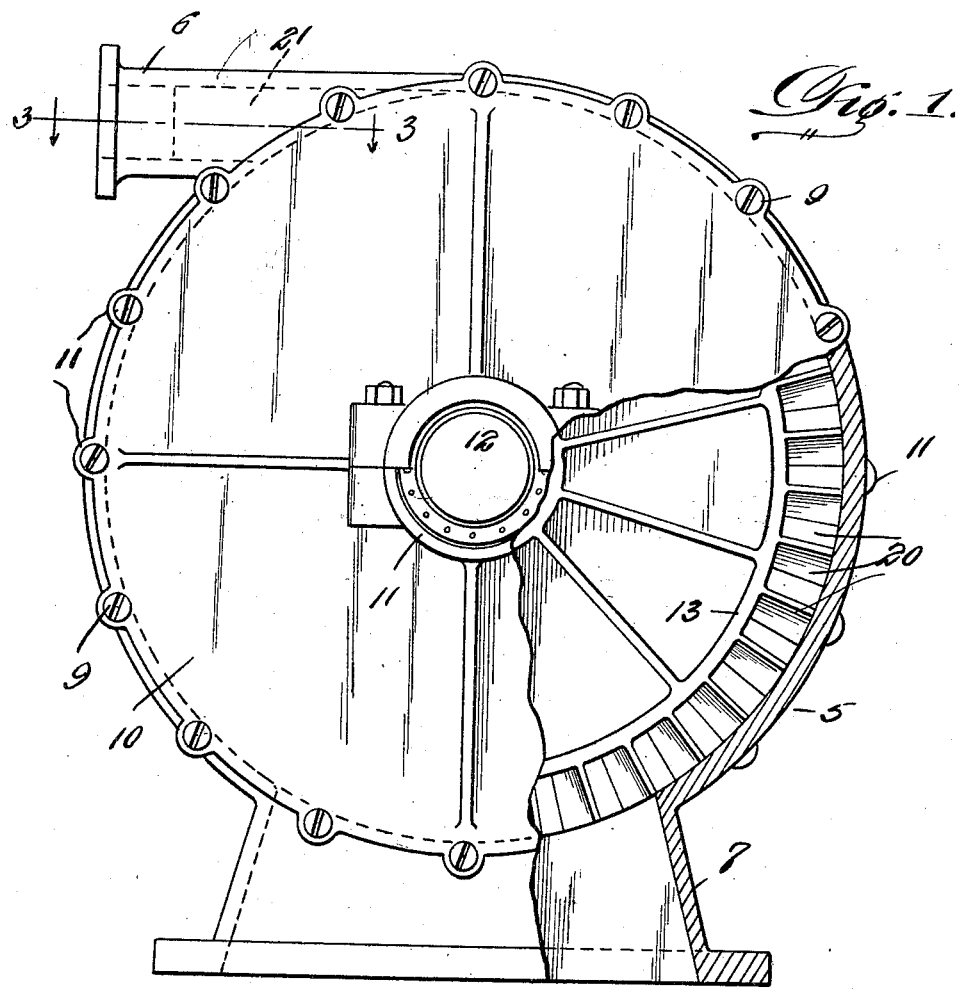
Figure 1 is a side elevational view of a fluid turbine constructed in accordance with the present invention, a portion of the side wall of the same being broken away for clearly disclosing the rotor within its casing.
Figure 3:
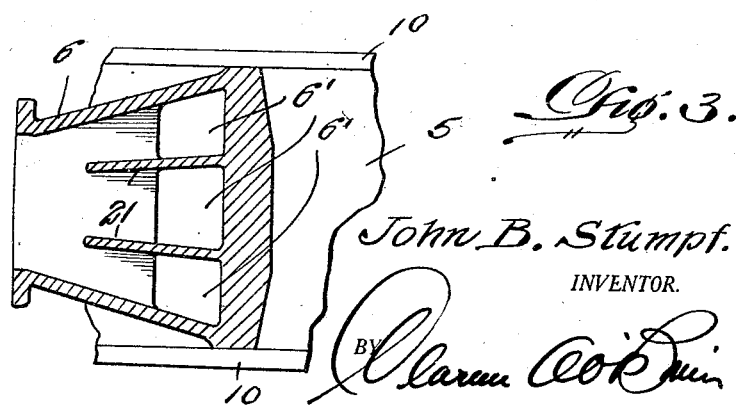
Figure 3 is a fragmentary sectional view of the inlet nozzle taken on the line 3—3 of Figure 1.

With particular reference to the drawings, the device contemplates the provision of a relatively enlarged annular casing 5 having an inlet nozzle 6, tangentially formed thereon, and an outlet nozzle 7 at the bottom thereof, which outlet nozzle is of relatively greater dimensions than the inlet 6 for allowing of the proper expansion of the fluid leaving the turbine. The opposite sides of the casing 5 are provided with spaced annular bosses 8, which bosses are internally screw threaded for receiving the set screws 9 of the side cover plates 10, these plates 10 being provided with suitably spaced and perforated ears 11 for the reception of the said screws 9.

Figure 2:
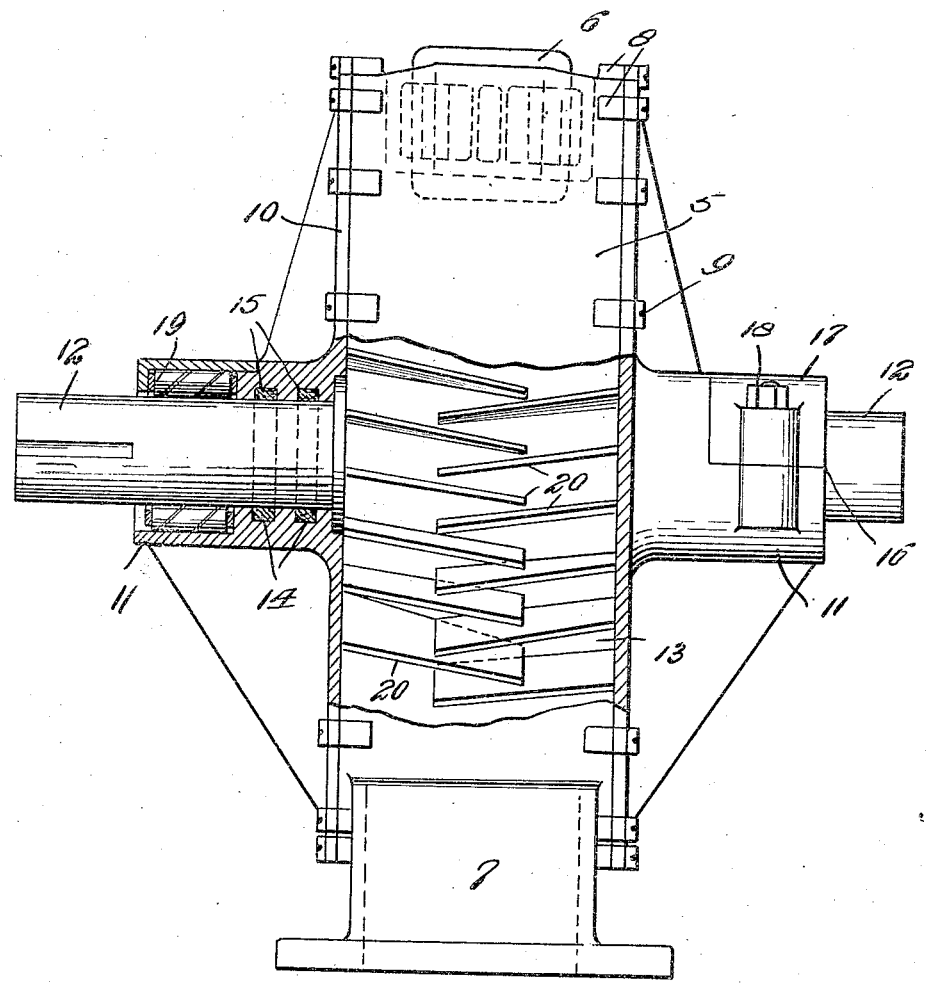
Figure 2 is an end elevational view of the device shown in Figure 1, partly in cross section, and partly in elevation.

Centrally formed upon each of the side conveyors 10 are projecting bearing sleeves 11 for receiving the oppositely projecting annular shaft portions 12 of a rotor 13. Each of the bearing sleeves 11 are suitably grooved as at 14 for receiving a packing 15 and a portion of the outer end of these sleeves are split as at 16 for receiving a clamping section 17, which clamping sections are secured to the split end of the sleeves by bolts 18. The split end of each of the sleeves and the upper clamping portion 17 are suitably channelled for receiving a desired form of roller bearing 19. The rotor 13 has formed thereon vanes 20, which vanes are in the form of transversely disposed flat strip members formed upon each side of the rotor and extending in a point slightly beyond the center of the rotor. The vanes 20 upon the opposite sides of the rotor are so arranged as to have their outer ends extend between adjacent vanes upon the opposite sides thereof. The said vanes 20 are so disposed upon the rotor as to slope downwardly at an acute angle to the longitudinal axis of the rotor as clearly set forth in Figure 2. The above mentioned tangentially arranged inlet nozzle 6 for the turbine is flared outwardly towards its connecting end with the casing 5, and communicates with the vanes upon the rotor through openings 6' in the casing. Formed upon the casing and extending forwardly, inwardly of the outer end of the nozzle 6 are spaced webs 21 defining a means within the nozzle for deflecting the fluid received therein into the spaced ones of the openings 6' for suitably conveying the fluid across the entire width of the rotor.

From the above description, it is believed by me that the advantages and operation of the present invention will be readily appreciated by those skilled in the art and while I have herein shown and described a preferred embodiment of this invention, it is nevertheless to be understood that minor changes may be made therein without departing from the spirit and scope of the invention as claimed.

What I claim as new is:—

A turbine comprising a casing having fluid inlet and outlet openings, a rotor journaled in the casing and having a true cylindrical peripheral surface, vanes mounted at their edges upon the periphery of the rotor and bridging the space between the rotor and the casing, said vanes being arranged in sets located at the opposite side portions of the rotor, the vanes being spaced apart at regular intervals, the inner end portions of the vanes of one set being disposed in the spaces between the inner end portions of the vanes of the opposite set, the vanes being straight from end to end in edge elevation and having side surfaces lying in parallel planes, the vanes being spirally positioned upon the periphery of the rotor, and the vanes of one set having their longitudinal dimensions disposed at obtuse angles to the longitudinal dimensions of the vanes of the opposite set, each of the vanes having all portions of its side surface lying in the same plane.

In testimony whereof I affix my signature.

JOHN B. STUMPF.